United States Patent
Qu

(10) Patent No.: US 7,983,778 B2
(45) Date of Patent: Jul. 19, 2011

(54) METHOD AND APPARATUS FOR REDUCING SETUPS DURING TEST, MARK AND PACK OPERATIONS

(75) Inventor: Peng Qu, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 784 days.

(21) Appl. No.: 11/964,207

(22) Filed: Dec. 26, 2007

(65) Prior Publication Data

US 2009/0171492 A1    Jul. 2, 2009

(51) Int. Cl.
*G06F 19/00* (2011.01)
(52) U.S. Cl. .................. 700/101; 700/99; 700/100
(58) Field of Classification Search ............ 700/99–103, 700/105; 705/7–9
See application file for complete search history.

(56) References Cited

U.S. PATENT DOCUMENTS

| | | | | |
|---|---|---|---|---|
| 5,444,632 A * | 8/1995 | Kline et al. | .......... | 700/100 |
| 5,446,671 A * | 8/1995 | Weaver et al. | .......... | 700/100 |
| 2005/0071031 A1 * | 3/2005 | Lin et al. | .......... | 700/101 |

OTHER PUBLICATIONS

Vieira et al. "Predicting the Performance of Rescheduling Strategies for Parallel Machine Systems" Journal of Manufacturing Systems vol. 19 No. 4. pp. 256-266, 2000.*

* cited by examiner

*Primary Examiner* — Ramesh B Patel
*Assistant Examiner* — Steven R Garland
(74) *Attorney, Agent, or Firm* — Williams, Morgan & Amerson, P.C.

(57) ABSTRACT

A method includes determining production targets for devices of different types in a production line. A queue level of devices of a first type that have completed performance of a first operation configured in accordance with a first setup state in the production line and await performance of a second operation in the production line is determined. Based on the determined queue level, a second type of device is selected for subsequent processing in the first operation based on the production targets and a setup time associated with configuring the first operation from the first setup state to a second setup state associated with the second type of device. The first operation is configured in accordance with the second setup state for processing devices of the second type.

22 Claims, 2 Drawing Sheets

METHOD AND APPARATUS FOR REDUCING SETUPS DURING TEST, MARK AND PACK OPERATIONS

CROSS-REFERENCE TO RELATED APPLICATIONS

Not applicable.

BACKGROUND OF THE DISCLOSURE

The disclosed subject matter relates generally to manufacturing and, more particularly, to a method and apparatus for reducing setups during test, mark, and pack operations.

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a wafer using a variety of processing tools, including photolithography steppers, etch tools, deposition tools, polishing tools, rapid thermal processing tools, implantation tools, etc. During the fabrication process various events may take place that affect the performance of the devices being fabricated. That is, variations in the fabrication process steps result in device performance variations. Factors, such as feature critical dimensions, doping levels, contact resistance, particle contamination, etc., all may potentially affect the end performance of the device.

After fabrication of the devices is complete, each wafer is subjected to preliminary functional tests, commonly referred to as final wafer electrical tests (FWET) that evaluate test structures on the wafer and SORT tests that evaluate each die. Wafers that pass these tests are then cut to singulate the individual die, which are then packed in substrates. Packed die are then subjected to additional tests against the specification of customers' orders to determine performance characteristics such as maximum operating speed, power, caches, etc.

Exemplary tests include initial class tests (ICL) that is a preliminary test for power and speed. ICL testing is usually followed by burn-in (BI) and post burn-in (PBI) tests that test packaged die under specified temperature and/or voltage stress, and automatic test equipment (ATE) tests that test die functionality. Then, packaged die with different characteristics go through system-level tests (SLT) in which they are tested against customer requirements on specific electrical characteristics. In SLT, packaged die are tested in an actual motherboard by running system-level tests (e.g., variance test programs). After completion of the testing, the devices are fused, marked, and packed to fill customer orders. This back-end processing is commonly referred to as the test, mark, pack (TMP) process.

TMP is the last process in semiconductor manufacturing before finished packages can be shipped to customers. The characteristics of the TMP process are high product mix and high volume. Even for the same product type, different variations may be present depending on specific customer requirements with respect to power, speed, etc. To satisfy these differing requirements, an extremely large number of processing specifications are used to define different temperatures, test programs, etc.

Due to the high product mix, the number of setup changes is large. While some setup changes are short (e.g., measured in seconds), other setup changes take 30 minutes or more (e.g., test program changes). Still other setup changes, such as smart burn-in setups, can require multiple shifts to complete. The large number of setup changes results in significant capacity loss. Hence, setup changes are a significant contributor to the utilization efficiency of the tools and to the overall throughput of the facility. This lost capacity reduces the efficiency, and thus, profitability of the facility.

Planning and scheduling techniques are difficult to implement for a TMP facility due to high uncertainties associated with both production and customer demand. For production lots in a TMP line, the future process flow is not readily determined as lots can be used to satisfy demands of different ordinary part numbers (OPNs). Depending on the requirements, some lots may be pushed to inventory and possibly even scrapped. Some lots change flows and specs as they pass through the TMP line. Due to these uncertainties associated with lots, it is not feasible to schedule devices in a TMP line using lot scheduling techniques.

This section of this document is intended to introduce various aspects of art that may be related to various aspects of the disclosed subject matter described and/or claimed below. This section provides background information to facilitate a better understanding of the various aspects of the disclosed subject matter. It should be understood that the statements in this section of this document are to be read in this light, and not as admissions of prior art. The disclosed subject matter is directed to overcoming, or at least reducing the effects of, one or more of the problems set forth above.

BRIEF SUMMARY OF THE DISCLOSURE

The following presents a simplified summary of the disclosed subject matter in order to provide a basic understanding of some aspects thereof. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the disclosed subject matter is seen in a method including determining production targets for devices of different types in a production line. A queue level of devices of a first type that have completed performance of a first operation configured in accordance with a first setup state in the production line and await performance of a second operation in the production line is determined. Based on the determined queue level, a second type of device is selected for subsequent processing in the first operation based on the production targets and a setup time associated with configuring the first operation from the first setup state to a second setup state associated with the second type of device. The first operation is configured in accordance with the second setup state for processing devices of the second type.

Another aspect of the disclosed subject matter is seen in a system including a production line and a setup selection unit. The production line includes at least a first tool configured in accordance with a first setup state and operable to perform a first operation and a second tool operable to perform a second operation. The setup selection unit is operable to determine production targets for devices of different types in the production line, determine a queue level of devices of a first type that have completed performance of the first operation and await performance of a second operation, select a second type of device for subsequent processing in the first operation based on the determined queue level, the production targets, and a setup time associated with configuring the first operation from the first setup state to a second setup state associated with the second type of device, and configure the first tool in accordance with the second setup state for processing devices of the second type.

BRIEF DESCRIPTION OF THE SEVERAL VIEWS OF THE DRAWINGS

The disclosed subject matter will hereafter be described with reference to the accompanying drawings, wherein like reference numerals denote like elements, and.

Figure 1:
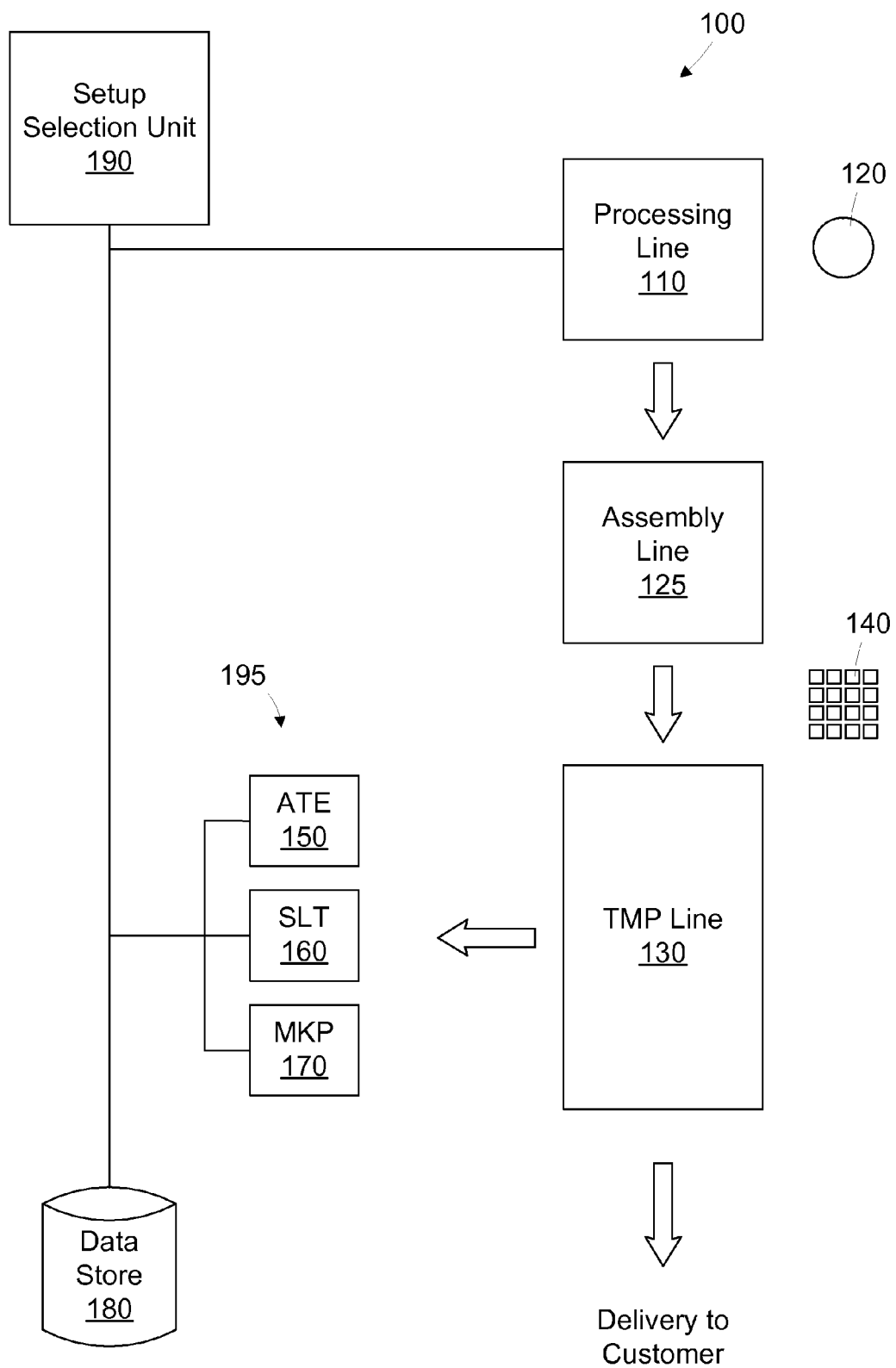
FIG. 1 is a simplified block diagram of a manufacturing system in accordance with one embodiment of the disclosed subject matter.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Portions of the disclosed subject matter are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "accessing" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices. Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

Referring now to the drawings wherein like reference numbers correspond to similar components throughout the several views and, specifically, referring to FIG. 1, the disclosed subject matter shall be described in the context of an illustrative manufacturing system 100. The manufacturing system 100 includes a processing line 110 for fabricating wafers 120, an assembly line 125 for cutting wafers and packing devices 140, a test, mark, pack (TMP) line 130 for processing the devices 140, an automated test equipment (ATE) tester 150, a system level tester (SLT) 160, a mark and pack tool (MKP) 170, a data store 180, and a setup selection unit 190. Generally, the setup selection unit 190 attempts to reduce the number of setup changes in the testers 150, 160 to increase the utilization percentage of the TMP line 130, thereby increasing its throughput. To that end, the setup selection unit 190 schedules setup points based on demand and the work-in-progress (WIP)/inventory profile.

In the illustrated embodiment, wafers 120 are processed by the processing line 110 to fabricate die thereon. The processing line 110 may include a variety of process tools and/or metrology tools, which may be used to process and/or examine the wafers to fabricate the semiconductor devices. For example, the process tools may include photolithography steppers, etch tools, deposition tools, polishing tools, rapid thermal anneal tools, ion implantation tools, and the like. The process metrology tools may include thickness measurement tools, scatterometers, ellipsometers, scanning electron microscopes, and the like. Techniques for processing the wafers 120 are well known to persons of ordinary skill in the art and therefore will not be discussed in detail herein for clarity and to avoid obscuring the present subject matter. Although a single wafer 120 is pictured in FIG. 1, it is to be understood that the wafer 120 is representative of a single wafer as well as a group of wafers, e.g. all or a portion of a wafer lot that may be processed in the processing line 110.

After the wafers 120 have been processed in the processing line 110 to fabricate the die, certain metrology tools, such as sort or final wafer electrical test (FWET) tools may be employed to collect electrical performance data while the wafer is still uncut. Sort metrology employs a series of probes to electrically contact pads on the completed die to perform electrical and functional tests. For example, a sort metrology tool may measure voltages and/or currents between various nodes and circuits that are formed on the wafer 120. Exemplary sort parameters measured include, but are not limited to, clock search parameters, diode characteristics, scan logic voltage, static $I_{DD}$, minimum $V_{DD}$, power supply open short characteristics, and ring oscillator frequency, etc. The particular sort parameters selected may vary depending on the application and the nature of the device formed on the die. Final wafer electrical testing (FWET) entails parametric testing of discrete structures like transistors, capacitors, resistors, interconnects and relatively small and simple circuits, such as ring oscillators. It is intended to provide a quick indication as to whether or not the wafer is within basic manufacturing specification limits. Wafers that exceed these limits are typically discarded so as to not waste subsequent time or resources on them.

After the die on the wafer 120 have completed preliminary testing, the wafers 120 are cut in the assembly line 125 to singulate the die. Each die is then each mounted to a package, resulting in the devices 140. The test units 150, 160 in the TMP line 130 then subject the devices 140 to various testing programs to grade the devices and verify full functionality. Although only single testers 150, 160 are illustrated, an actual implementation will involve multiple testers 150, 160 of each type. In addition, a particular tester 150, 160 may test multiple devices 140 in parallel.

Typically, ATE testers 150 are designed for high throughput, high accuracy testing. For example, an ATE tester 150 generally can run tests at different voltage levels with precise voltage control. The system level tester 160 is configured to test devices in an actual system environment, such as by booting an operating system. System level testers 160 do not exhibit the speed characteristics or the voltage control characteristics of ATE testers 150. The data store 180 houses information related to the testing of the devices 140 over the plurality of test program runs, or insertions.

The setup selection unit 190 employs a setup scheduling technique that attempts to reduce the number of setup changes while still meeting customer demands in view of current WIP and inventory profiles. Within the TMP line 130, post burn-in (PBI) testing in the ATE testers 150 is the bottleneck operation that controls the overall throughput. During PBI testing, devices are characterized and sorted into bins. The yield of various devices into different bins can vary significantly. Typically, there is a significantly smaller yield for devices that fall into high performing bins. System level testing (SLT) in the SLT testers 160 follows PBI testing. Within the TMP line 130, tools may be divided into groups 195 that are each configured using a similar setup to process a particular lot of devices 140. Multiple instances of each tool type may be present in each group 195.

The setup selection unit 190 employs a linear mixed-integer programming model for selecting setups for a particular group 195. In such an optimization based approach, solutions are driven by a plurality of objectives. Constraints are defined that serve as conditions to narrow down the solution scope. With a commercially or publicly available solver, a linear (i.e., either integer or non-integer) solution can be identified within the solution scope. For example, the OSL solver offered by IBM, Corporation is a commercially available software tool that may be used. For purposes of the following description, the following notation list identifies symbols used in the following objective and constraint equations.

T[o,s] Customer order target for OPN o at shift s
RT[r,s] Remaining production target of device r at shift s
I[r,s] Incoming material for device r at shift s
S[r,b,o] Manufacturing specification flag that indicates if device r after it finishes an operation and falls into bin b can be used to meet OPN o
Y[r,b] Yield for device r to bin b
P[r,s] Production target for device r at shift s
UPH[r] Units per hour processing rate for device r
W[r,s] Starting WIP of device r at shift s
E[s] Available equipment hours at shift s
ST[R,r] Setup time from setup R to setup r In a first portion of the setup selection routine, the setup selection unit 190 calculates the production target for each device at each shift by employing the following objective function:

$$\text{Minimize} \sum_{r,s} I[r, s]. \tag{1}$$

The objective function of Eq. 1 seeks to minimize the incoming materials. Incoming materials are pulled by the TMP line 130 from assembly, and all die pulled from assembly can no longer be reworked. The goal of the objective function is to only pull the die that can be used to potentially support demand.

The setup selection unit 190 employs a basic material flow equation defined by:

$$W[r,s]=W[r,s-1]+I[r,s-1]-P[r,s-1] \forall r,s;s>0. \tag{2}$$

The starting inventory of a current shift is the same as the starting inventory of previous shift plus the incoming materials of previous shift minus what has been tested in previous shift.

The OPN is the ID customers use to place orders. Each OPN can be made by many devices, r. Each device can also be made to meet the requirements for many OPNs. Hence, a multi-to-multi relationship exists. However, depending on the particular device used and OPN to be met, the yield is not the same. Yield is represented as a bin distribution. In other words a certain number of die will be tested and sorted to different bins. Each bin contains die having similar electronic characteristics (e.g., power, speed, etc). Certain bins can only be used to meet certain OPNs, and some bins can be used to meet all OPNs. This relationship is defined by the manufacturing spec as defined by S[r,b,o].

$$\sum_r \sum_{b, \text{for } S[r,b,o]} P[r,s]Y[r,b] \geq T[o,s] \quad \forall \, o, s \qquad (3)$$

Eq. 3 specifies that for all test materials at a certain shift with the consideration of bin distribution, the levels must be able to support at least the OPN targets of the shift, which typically tie into customer orders.

The following constraint seeks to ensure that sufficient capacity is available to support production. The production materials converted to hours must be less than all available equipment hours for the shift. Note that setup is considered as part of the utilization of equipment.

$$\sum_r^{P[r,s]} UPH[r] \leq E[s] \qquad (4)$$

The second step in determining the setup selection is to evaluate the setup points. Please note that the overall objective of production is to meet customer orders T[o,s]. In other words, setup points are optimized only to the extent customer orders can be achieved. The previous step calculated P[r,s], the production target minimally required to support customer orders. The production target is optimized based on minimizing the incoming materials. Subsequently, setup points may be defined to address equipment and line balancing aspects. Since setup loss is taken into consideration by including the equipment hours in Eq. 4, subsequent scheduling of setup points does not affect commitment to target production levels. However, setup scheduling can affect downstream line performance.

For example, consider two devices, one with 90% yield of good bins and the other with 40% yield of good bins. In determining the material requirements, assume that 50 thousand devices should be started for each device type to meet the expected customer requirements. Considering the particular operation considered in this approach, which is the key Bin out operation, the equipment utilization and performance are not greatly affected based on how the setup points are scheduled as there are 100 thousand devices that need to be tested. However, considering downstream equipment, if the first device type is tested first and then the line is switched to the second type of device, a large WIP bubble of 45 thousand devices may be present in the first half of the shift and then only 20 thousand for the rest of the shift, which causes a highly unbalanced production line. In this example, the setup points should be scheduled to ensure the downstream operations have a good balance of materials so the production inventory can be minimized.

The setup selection unit 190 employs an inventory control technique commonly referred to as an (s, S) model, but employs the technique to selecting setup points. In general, when employing an (s, S) model, whenever the inventory position drops to the reorder point s or lower, an order is placed to raise the position to the order-up-to level S. Within the context of scheduling setup points, the setup selection unit 190 attempts to maintain a constant WIP (S) while preventing downstream equipment from starvation (by enforcing safe stock point s). The reorder point, s, is the trigger for potential setup changes. Note that s is an aggregated volume for all devices.

When the reorder trigger is enabled, it enacts a pull, or possible setup change, for many device choices for a particular group 195 after the current lot has been completed. With that in mind, a setup point is triggered downstream based on production conditions. When a trigger for more materials occurs, the setup selection unit 190 decides whether to implement a setup change and switch other devices after processing of the current lot has completed. Also whenever a production target for a certain device is met or the supply of materials is exhausted, a setup point is automatically scheduled. Otherwise, the current product is continued to feed downstream operations. When the setup point is triggered, it will apply to one device type or zero device types (i.e., no need to change). The setup selection unit 190 decides which device should be setup, if any, for the setup change, in response to a trigger.

The triggering and setup selections are applied to individual groups 195 defined in the TMP line 130. The tools 150, 160 in a particular group 195 receive the same setups and are dedicated to processing a given lot. In the illustrated embodiment, the triggering applies to the downstream queue for the SLT tester 160 in the group 195, as the ATE testers 150 that perform the PBI testing form the bottleneck for the group 195. A triggering event occurs for a particular group 195 when the triggering queue level, s, is reached.

After evaluating the incoming materials, as described above, the setup selection unit 190 evaluates finished material, deducting their contributions in s for every device and filtering out those that have met production targets. The candidate devices that still need more materials to meet their targets are ranked in ascending order using the equation:

$$\text{Rank}[r] = ST[R,r] + \frac{RT[r,s]}{\sum_{b \in \text{Goodbins}} Y[r,b]UPH[r]}. \qquad (5)$$

The ranking equation essentially determines an estimated time that would elapse before the queue level can be brought back up to the target queue level, S. The highest ranking device type (i.e., the shorted queue replenishment time) is selected for the setup point. The ranking equation provides the remaining target, RT[r,s], for the shift and calculates its quantity before yield loss for all good bins (i.e., bins with OPN demand) and then converts it to hours by dividing by UPH[r]. This rough calculation of overall test time plus the setup time required (i.e., S[R,r] in which R is the current setup and r is the proposed new setup) provides an estimate of the time required to receive the materials from the PBI testing queue to fill in the safe stock of the downstream operations (i.e., the SLT testing queue). If R is the same as r, then no setup is needed.

Although the preceding example illustrated PBI testing as a bottleneck that feeds SLT testing operations, the application of the disclosed techniques is not limited to this particular example. The setup selection techniques may be applied generally to manufacturing operations where an upstream process event sorts items into different categories (e.g., bins) that may or may not be used to fill customer orders. The queue level of operations downstream from the characterization operation may be evaluated to determine setup requirements for the characterization operation to balance the production line.

Figure 2:
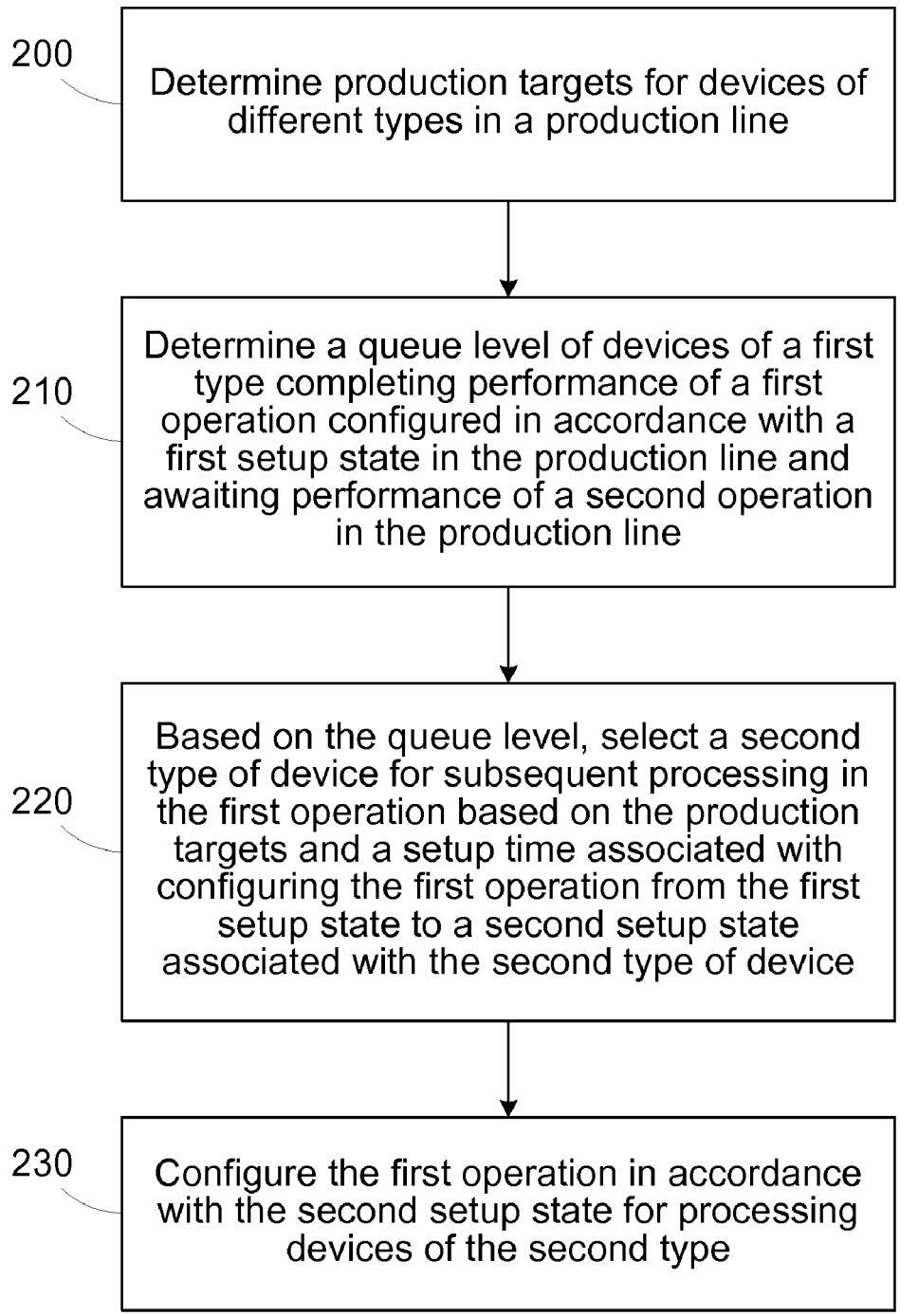
FIG. 2 is a simplified flow diagram of a method for selecting setup points in accordance with another embodiment of the disclosed subject matter.

Turning now to FIG. 2, a simplified flow diagram of a method for selecting setup points in accordance with another embodiment of the present subject matter is provided. In method block 200, production targets are determined for devices of different types in a production line. In method block 210, a queue level of devices of a first type completing performance of a first operation configured in accordance with a first setup state in the production line and awaiting performance of a second operation in the production line is determined. In method block 220, based on the queue level, a second type of device is selected for subsequent processing in the first operation based on the production targets and a setup time associated with configuring the first operation from the first setup state to a second setup state associated with the second type of device. In method block 230, the first operation is configured in accordance with the second setup state for processing devices of the second type.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

I claim:

1. A method, comprising:
    determining production targets for devices of different types in a production line;
    determining a queue level of devices of a first type that have completed performance of a first operation configured in accordance with a first setup state in the production line and await performance of a second operation in the production line;
    selecting a second type of device for subsequent processing in the first operation based on the determined queue level, the production targets and a setup time associated with configuring the first operation from the first setup state to a second setup state associated with the second type of device; and
    configuring the first operation in accordance with the second setup state for processing devices of the second type.

2. The method of claim 1, further comprising initiating the selecting of the second type of device responsive to the queue level falling below a first predetermined level.

3. The method of claim 2, wherein selecting the second type of device further comprises:
    identifying a plurality of candidate types of devices for subsequent processing in the first operation based on the production targets;
    determining an estimated length of time to bring the queue level of devices awaiting performance of the second operation to a second predetermined level greater than the first predetermined level by adding devices of a particular candidate type to an associated queue level for each of the candidate types; and
    selecting the candidate type having the shortest estimated length of time to bring the queue level to the second predetermined level as the second type.

4. The method of claim 3, wherein determining the estimated length of time to bring the queue level to the second predetermined level for a particular candidate type comprises:
    determining a remaining production target for the particular candidate type;
    determining a yield parameter associated with the particular candidate type;
    determining a processing rate of the first operation for the particular candidate type; and
    determining the estimated length of time based on the remaining production target, the yield parameter, and the processing rate.

5. The method of claim 1, wherein determining production targets further comprises determining the production targets using an objective function that seeks to minimize incoming materials to the production line.

6. The method of claim 5, further comprising evaluating the objective function subject to a constraint that relates production targets and yield to customer order targets.

7. The method of claim 5, further comprising evaluating the objective function subject to a constraint that relates production targets to processing rates of the first operation with respect to the different types of devices to available equipment hours of the production line for the first operation.

8. The method of claim 5, further comprising evaluating the objective function using a workflow equation that determines incoming materials based on work-in-process and the production targets for the different types of devices.

9. The method of claim 1, wherein the devices include integrated circuit devices, the first operation comprises a post burn-in test operation and the second operation comprises a system level test operation.

10. The method of claim 1, wherein the devices are grouped into lots, and the method further comprises:
    completing processing of a first lot of the first type in the first operation prior to configuring the first operation in accordance with the second setup state; and
    processing a second lot of devices of the second type in the first operation.

11. The method of claim 1, wherein the production line comprises at least a first tool operable to perform the first operation and at least a second tool operable to perform the second operation.

12. A system, comprising:
    a production line including at least a first tool configured in accordance with a first setup state and operable to perform a first operation and a second tool operable to perform a second operation; and
    a setup selection unit operable to determine production targets for devices of different types in the production line, determine a queue level of devices of a first type that have completed performance of the first operation and await performance of a second operation, select a second type of device for subsequent processing in the first operation based on the determined queue level, the production targets, and a setup time associated with configuring the first operation from the first setup state to a second setup state associated with the second type of device, and configure the first tool in accordance with the second setup state for processing devices of the second type.

13. The system of claim 12, wherein the setup selection unit is operable to initiate the selecting of the second type of device responsive to the queue level falling below a first predetermined level.

14. The system of claim 13, wherein the setup selection unit is further operable to identify a plurality of candidate types of devices for subsequent processing in the first operation based on the production targets, determine an estimated length of time to bring the queue level of devices awaiting performance of the second operation to a second predetermined level greater than the first predetermined level by adding devices of a particular candidate type to an associated queue level for each of the candidate types, and select the candidate type having the shortest estimated length of time to bring the queue level to the second predetermined level as the second type.

15. The system of claim 14, wherein the setup selection unit is operable to determine the estimated length of time to bring the queue level to the second predetermined level for a particular candidate type by determining a remaining production target for the particular candidate type, determining a yield parameter associated with the particular candidate type, determining a processing rate of the first operation for the particular candidate type, and determining the estimated length of time based on the remaining production target, the yield parameter, and the processing rate.

16. The system of claim 12, wherein the setup selection unit is further operable to determine production targets using an objective function that seeks to minimize incoming materials to the production line.

17. The system of claim 16, wherein the setup selection unit is further operable to evaluate the objective function subject to a constraint that relates production targets and yield to customer order targets.

18. The system of claim 16, wherein the setup selection unit is further operable to evaluate the objective function subject to a constraint that relates production targets to processing rates of the first operation with respect to the different types of devices to available equipment hours of the production line for the first operation.

19. The system of claim 16, wherein the setup selection unit is further operable to evaluate the objective function using a workflow equation that determines incoming materials based on work-in-process and the production targets for the different types of devices.

20. The system of claim 12, wherein the devices include integrated circuit devices, the first operation comprises a post burn-in test operation and the second operation comprises a system level test operation.

21. The system of claim 12, wherein the devices are grouped into lots, and the first tool is operable to complete processing of a first lot of the first type in the first operation prior to the setup selection unit configuring the first operation in accordance with the second setup state and process a second lot of devices of the second type in the first operation after processing the first lot.

22. A system comprising:
  means for determining production targets for devices of different types in a production line;
  means for determining a queue level of devices of a first type that have completed performance of a first operation configured in accordance with a first setup state in the production line and await performance of a second operation in the production line;
  means for selecting a second type of device for subsequent processing in the first operation based on the determined queue level, the production targets and a setup time associated with configuring the first operation from the first setup state to a second setup state associated with the second type of device; and
  means for configuring the first operation in accordance with the second setup state for processing devices of the second type.

\* \* \* \* \*